US010386648B2

(12) United States Patent
Haruyama et al.

(10) Patent No.: US 10,386,648 B2
(45) Date of Patent: Aug. 20, 2019

(54) IMAGE DISPLAY SYSTEM

(71) Applicant: Innolux Corporation, Miao-Li County (TW)

(72) Inventors: Yoshitaka Haruyama, Miao-Li County (TW); Naoki Sumi, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 363 days.

(21) Appl. No.: 15/230,539

(22) Filed: Aug. 8, 2016

(65) Prior Publication Data
US 2018/0039090 A1    Feb. 8, 2018

(51) Int. Cl.
*G02B 5/12* (2006.01)
*G02B 5/30* (2006.01)
*G02B 27/22* (2018.01)
*G02B 27/26* (2006.01)

(52) U.S. Cl.
CPC ............... *G02B 27/26* (2013.01); *G02B 5/12* (2013.01); *G02B 5/3025* (2013.01); *G02B 5/3083* (2013.01); *G02B 27/2292* (2013.01)

(58) Field of Classification Search
CPC .......... G02B 5/12; G02B 5/124; G02B 5/208; G02B 5/136; G02B 5/26; G02B 27/283; G02B 2027/0138; G02B 27/0172; G02B 5/122; G02B 2027/014; G02B 2027/0187; G02B 27/2292; G02B 5/128; G02B 5/0284; G02B 5/04; G02B 5/045; G02B 5/08

See application file for complete search history.

(56) References Cited

U.S. PATENT DOCUMENTS

| | | | |
|---|---|---|---|
| 7,443,585 B2 * | 10/2008 | Hara | G02B 5/3016 349/18 |
| 2009/0066886 A1 * | 3/2009 | Shimizu | G02B 5/305 349/96 |
| 2011/0181949 A1 | 7/2011 | Hashikawa | |
| 2014/0218668 A1 * | 8/2014 | Sakai | G02F 1/13363 349/102 |
| 2016/0156887 A1 * | 6/2016 | Liu | H04N 13/349 348/744 |

\* cited by examiner

*Primary Examiner* — Evan P Dzierzynski
*Assistant Examiner* — Sharrief I Broome
(74) *Attorney, Agent, or Firm* — McClure, Qualey & Rodack, LLP

(57) ABSTRACT

An image display system is provided. The image display system includes a display device; a reflecting unit; a first polarizer disposed between the display device and the reflecting unit; and a second polarizer, wherein the reflecting unit is located between the first polarizer and the second polarizer; wherein a first angle from an absorption axis of the first polarizer to an absorption axis of the second polarizer in counterclockwise direction is between 0±10 degrees.

20 Claims, 13 Drawing Sheets

IMAGE DISPLAY SYSTEM

TECHNICAL FIELD

The disclosure relates in general to an image display system, and more particularly to an image display system producing 3D images.

BACKGROUND

Recently, floating image displays have been a developing new technology for displaying floating images in the air, which is a promising start for the human interactive display devices in the future. While the currently developed floating images are still two-dimensional images, how to provide 3D floating images has become a prominent task to the industries.

SUMMARY

The disclosure is directed to an image display system. With the design of the embodiments of the disclosure, the light efficiencies of most ghost images can be significantly reduced, while the light efficiency of the desired 3D floating image can be substantially maintained. Therefore, the ghost images can be substantially eliminated, the desired 3D floating image can be provided with higher brightness and clearness, and thus an improved display effect of 3D floating images can be provided.

According to one embodiment of the disclosure, an image display system is provided. The image display system includes a display device; a reflecting unit; a first polarizer disposed between the display device and the reflecting unit; and a second polarizer, wherein the reflecting unit is located between the first polarizer and the second polarizer; wherein a first angle from an absorption axis of the first polarizer to an absorption axis of the second polarizer in counterclockwise direction is between 0±10 degrees.

According to another embodiment of the disclosure, an image display system is provided. The image display system includes a display device; a reflecting unit; a first polarizer disposed between the display device and the reflecting unit; a second polarizer, wherein the reflecting unit is located between the first polarizer and the second polarizer, wherein a first angle from an absorption axis of the first polarizer to an absorption axis of the second polarizer in counterclockwise direction is between 0±10 degrees; and a first retarder and a second retarder disposed between the first polarizer and the second polarizer; wherein an included angle from a linear polarization of a light passing through the first retarder to the second retarder and the absorption axis of the second polarizer in counterclockwise direction is between 90±10 degrees.

The above and other aspects of the invention will become better understood with regard to the following detailed description of the preferred but non-limiting embodiment(s). The following description is made with reference to the accompanying drawings.

DETAILED DESCRIPTION

Detailed descriptions of the embodiments of the disclosure are disclosed below with accompanying drawings. In the accompanying diagrams, the same numeric designations indicate the same or similar components. It should be noted that accompanying drawings are simplified so as to provide clear descriptions of the embodiments of the disclosure, and the following detailed description are exemplary and explanatory only and are not restrictive of the disclosed embodiments as claimed. Anyone who is skilled in the technology field of the disclosure can make necessary modifications or variations to the structures according to the needs in actual implementations.

Figure 1:
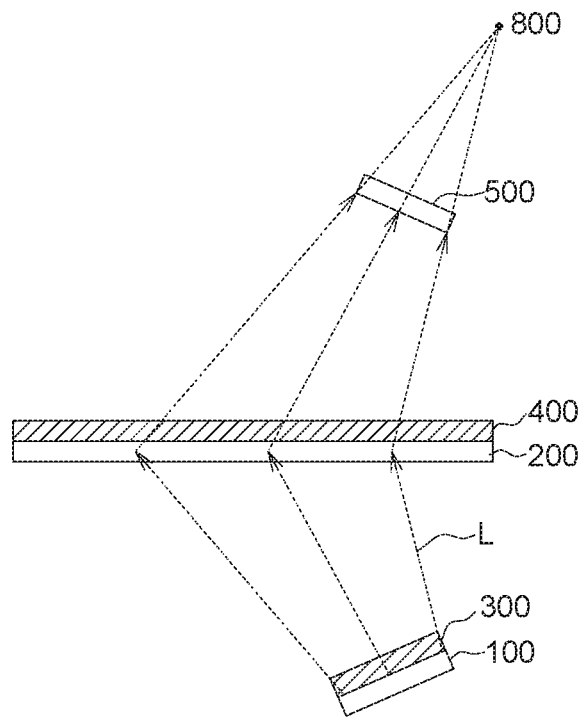
FIG. 1 is a schematic view of an image display system according to an embodiment of the disclosure.

FIG. 1 is a schematic view of an image display system 10 according to an embodiment of the disclosure. As shown in FIG. 1, the image display system 10 includes a display device 100, a reflecting unit 200, a first polarizer 300, and a second polarizer 400. The first polarizer 300 is disposed between the display device 100 and the reflecting unit 200. The reflecting unit 200 is located between the first polarizer 300 and the second polarizer 400. A first included angle from an absorption axis of the first polarizer 300 to an absorption axis of the second polarizer 400 in counterclockwise direction is equal to or less than 10 degrees and equal to or greater than −10 degrees (between 0±10 degrees). As shown in FIG. 1, lights L from the display device 100 are twice reflected by the reflecting unit 200 and form a 3D floating image 500 on a virtual floating base plane. The display device 100 could be a liquid crystal display (LCD), a light emitting diode display (LED), or an organic light emitting diode display (OLED).

In the embodiments, the absorption axis of the first polarizer 300 is substantially parallel to the absorption axis of the second polarizer 400.

As shown in FIG. 1, the second polarizer 400 is disposed between the reflecting unit 200 and the virtual floating base plane where a 3D floating image 500 is formed. In the embodiment as shown in FIG. 1, the second polarizer 400 is attached to a front surface of the reflecting unit 200 and disposed facing the observer 800. The observer 800 may stay at or be adjacent to the virtual floating base plane. A view point angle from the observer 800 to the reflecting unit 200 is greater than 40 degrees and less than 50 degrees for reducing a reflection effect from the bottom surface of reflecting unit 200. The reflection effect is ambient light reflected by the interface of the reflecting unit 200 and the air (bottom surface of the reflecting unit 200).

In the embodiment, as shown in FIG. 1, the first polarizer 300 is attached to a front surface of the display device 100. In the other embodiment, the first polarizer 300 could be attached to a bottom surface of the reflecting unit 200.

According to the embodiments of the disclosure, the reflecting unit 200 is capable of reflecting an incoming light from the display device 100 twice for producing a 3D floating image 500 on the virtual floating base plane. For example, the reflecting unit 200 may include a crossed mirror array or a total internal reflection (TIR) structure. A TIR structure normally includes a transparent body with air holes formed therein, and the huge difference between the refractive index of air of the air holes and the refractive index of the resin material of the transparent body results in total internal reflection of incoming lights, producing a 3D floating image 500 formed from twice reflected lights. However, the selections of types of the reflecting unit 200 applied in the embodiments of the disclosure can vary according to actual needs and are not limited to the above examples.

Figure 2:
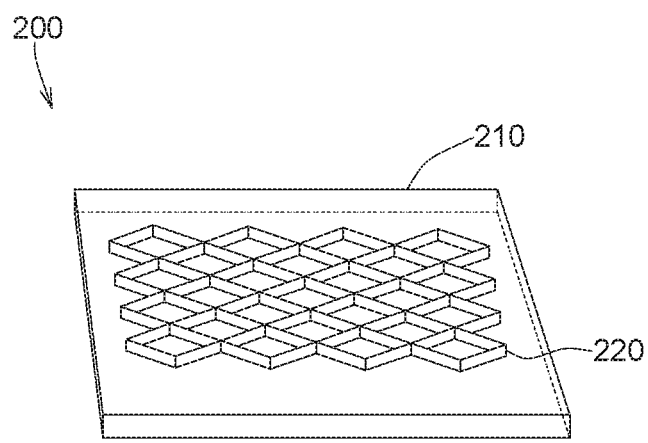
FIG. 2 is a schematic view of a reflecting unit according to an embodiment of the disclosure.

FIG. 2 is a schematic view of a reflecting unit 200 according to an embodiment of the disclosure. Referring to FIG. 2, the reflecting unit 200 in the embodiment as shown in FIG. 2 is a crossed mirror array, and the crossed mirror array includes a transparent substrate 210 and vertical mirror walls 220 with crossing angles of about 90 degrees disposed on the transparent substrate 210. The transparent substrate 210 may be a glass substrate or a plastic substrate, and the mirror walls 220 may be made of high reflectivity materials such as aluminum or silver.

Figure 3A:
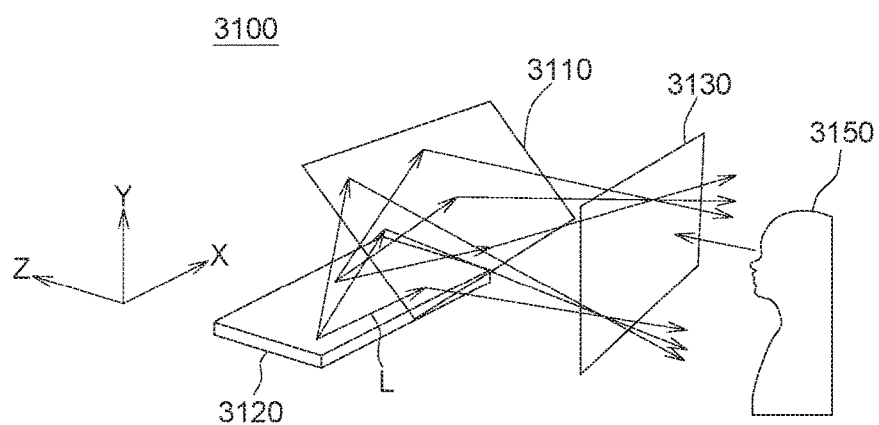
FIG. 3A is a schematic views of a common 3D floating image display system.
Figure 3B:
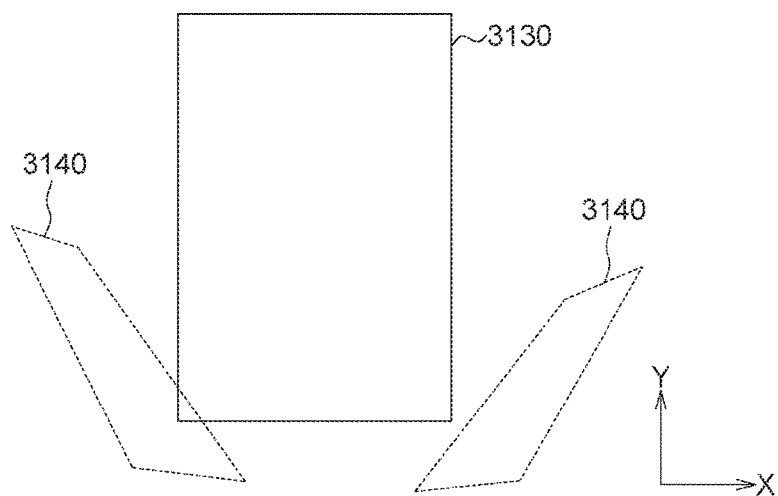
FIG. 3B is a schematic view of images produced by a common 3D floating image display system.

FIG. 3A is a schematic views of a common 3D floating image display system, and FIG. 3B is a schematic view of images produced by a common 3D floating image display system. As shown in FIGS. 3A-3B, a common 3D floating image display system 3100 may include a crossed mirror array 3110 and a display device 3120 with an attached polarizer which is disposed between the display device 3120 and the crossed mirror array 3110. In the common 3D floating image display system, there is no other polarizer placed between the crossed mirror array 3110 and an observer 3150. As shown in FIGS. 3A-3B, lights L from the display device 3120 passing through the polarizer and the crossed mirror array 3110 would form a 3D floating image 3130 produced from twice reflected lights and undesired images 3140 produced by once reflected lights, and these images can both been seen by the observer 3150. The undesired images 3140 are also called ghost images, and the appearance of the ghost images are undesired. As shown in FIG. 3B, the undesired images 3140 (ghost images) appear on two opposite sides of the 3D floating image 3130.

According to the image display systems of the embodiments of the disclosure, the ghost images can be eliminated by controlling polarization states of the lights outputted from the display device. FIGS. 4(a)~4(i) show simulation results of polarization states of outputted lights from the display device 100 of the image display system 10 according to an embodiment of the disclosure in FIG. 1, wherein outputted lights from the display device 100 are linearly polarized by the first polarizer 300 before entering the reflecting unit (e.g. crossed mirror array) 200. FIGS. 5(a)~5(i) show simulation results of polarization states of outputted lights from a display device of a common 3D floating image display system, wherein outputted lights from the display device are linearly polarized by the polarizer before entering the crossed mirror array. In the following figures of simulation results, such as in FIGS. 4(a)~4(i) and 5(a)~5(i), Es on x axis represents senkrecht electric field amplitude, and Ep on y axis represents parallel electric field amplitude.

Figure 4:
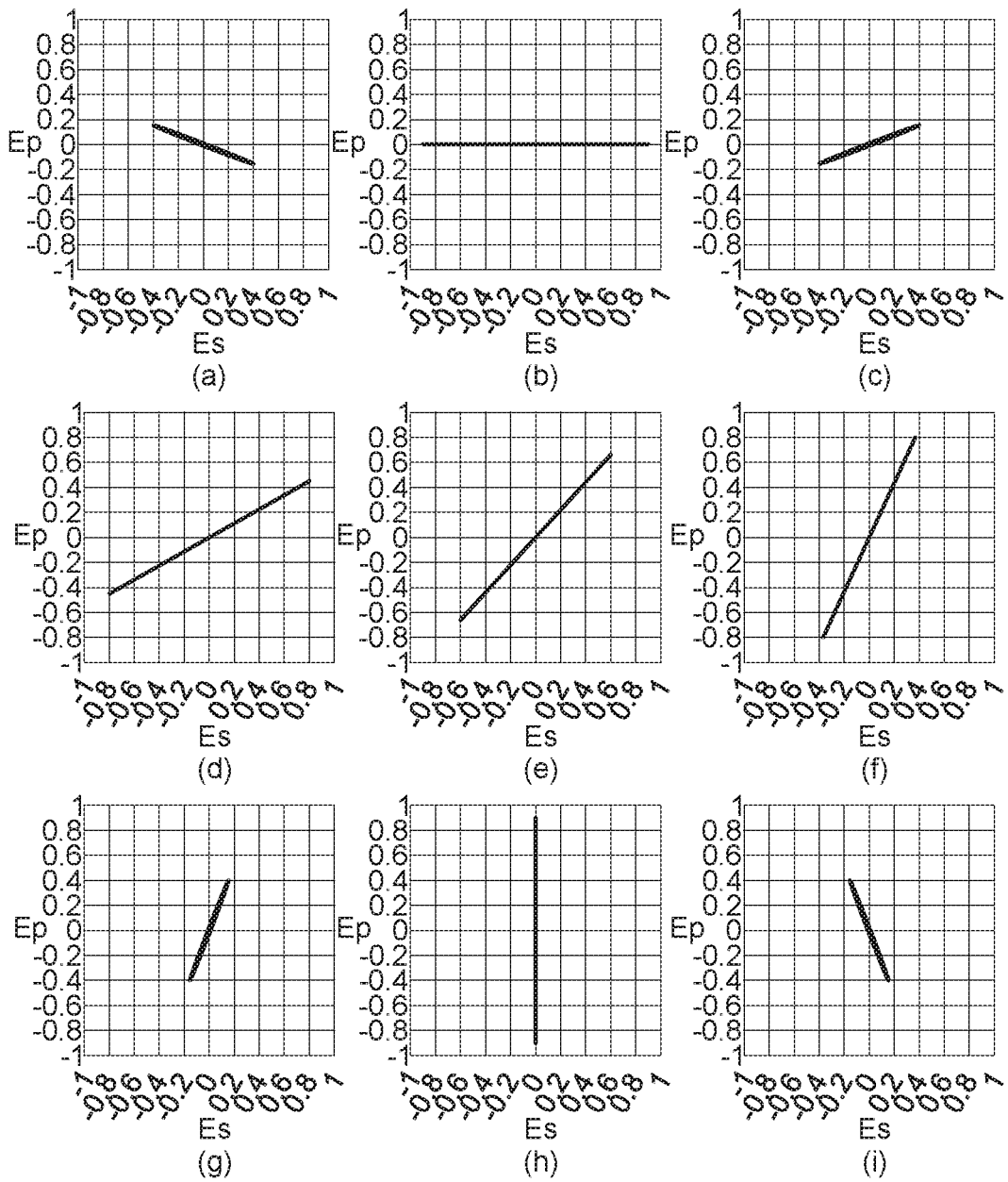
FIG. 4 shows simulation results (a)-(i) of polarization states of outputted lights from the display device of the image display system according to an embodiment of the disclosure.
Figure 5:
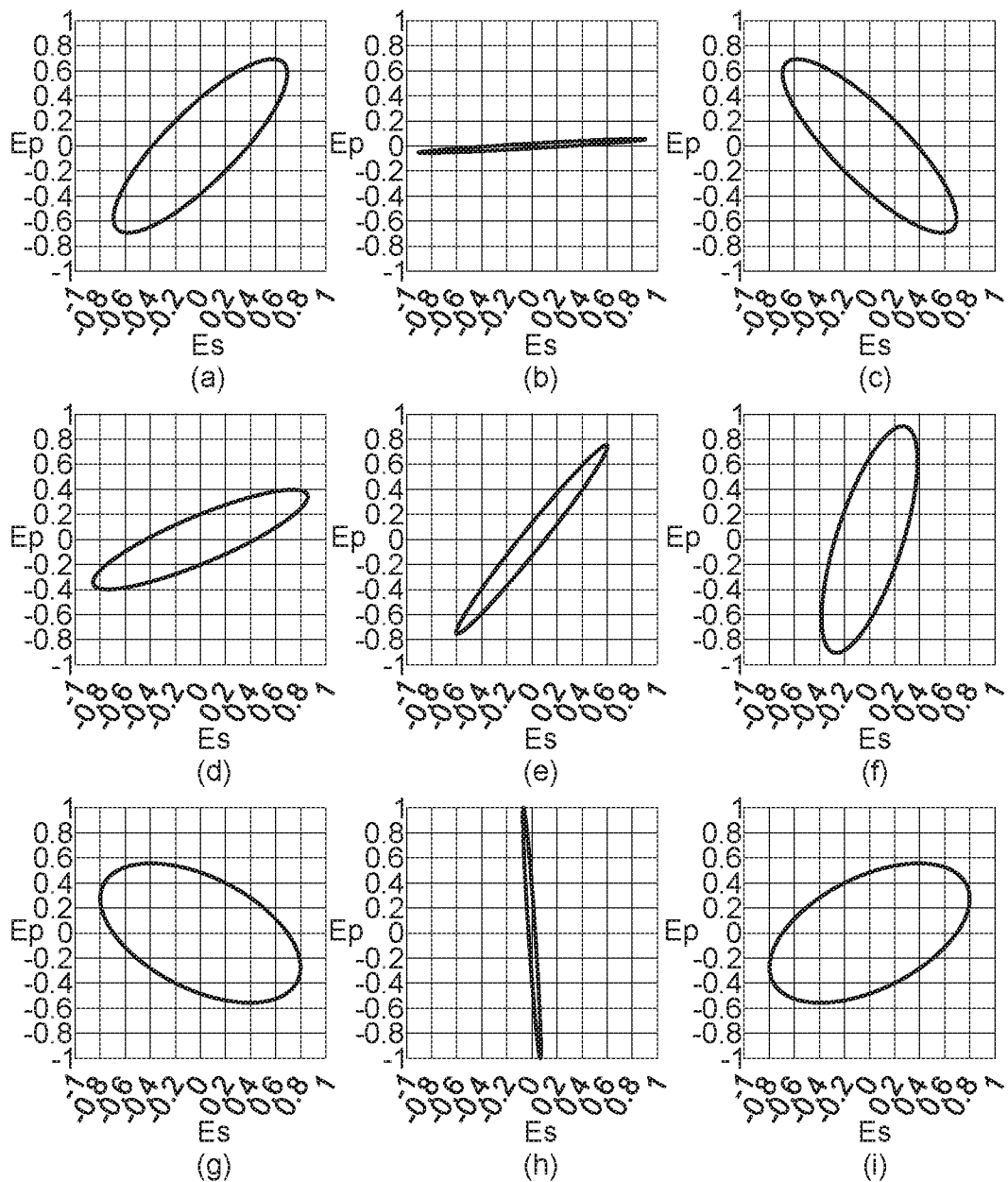
FIG. 5 shows simulation results (a)-(i) of polarization states of outputted lights from a display device of a common 3D floating image display system with a crossed mirror array, wherein outputted lights from the display device are linearly polarized by a polarizer before entering the crossed mirror array.

FIGS. 4(a)-4(c) show polarization states of left once reflected lights (a), twice reflected lights (b), and right once reflected lights (c) when the transmittance axis of the first polarizer 300 is 0 degree (along the X axis); that is, the absorption axis of the first polarizer 300 is 90 degrees (along the Y axis). FIGS. 4(d)-4(f) show polarization states of left once reflected lights (d), twice reflected lights (e), and right once reflected lights (f) when the transmittance axis of the first polarizer 300 is 45 degrees (on the X-Y plane, and calculating included angle from X axis in counterclockwise direction), and FIGS. 4(g)-4(i) show polarization states of left once reflected lights (g), twice reflected lights (h), and right once reflected lights (i) when the transmittance axis of the first polarizer 300 is 90 degrees (along the Y axis). FIGS. 5(a)-5(c) show polarization states of left once reflected lights (a), twice reflected lights (b), and right once reflected lights (c) after outputted lights pass through the polarizer with a transmittance axis of 0 degree (along the X axis). FIGS. 5(d)-5(f) show polarization states of left once reflected lights (d), twice reflected lights (e), and right once reflected lights (f) after outputted lights pass through the polarizer with a transmittance axis of 45 degrees (on the X-Y plane, and calculating included angle from X axis in counterclockwise direction). FIGS. 5(g)-5(i) show polarization states of left once reflected lights (g), twice reflected lights (h), and right once reflected lights (i) after outputted lights pass through the polarizer with a transmittance axis of 90 degrees (along the Y axis). The twice reflected lights form the desired 3D floating image, and the left once reflected lights and the right once reflected lights form ghost images.

As shown in FIGS. 5(a)-5(i), the outputted lights pass through the polarizer and then pass through the crossed mirror array, and the resulting once reflected lights show less linear polarization state and more circular or elliptical polarization state than the twice reflected lights. As shown in FIGS. 4(a)-4(i), after the reflected lights pass through the second polarizer 400 which has an absorption axis substantially parallel to the first polarizer 300, all of the once reflected lights and the twice reflected lights show more linear polarization state and less circular or elliptical polarization state. That is, most of twice reflected lights (desired 3D floating image) could pass through the second polarizer 400, and a lot of the lights of once reflected lights (ghost images) have been filtered and blocked by the second polarizer 400. Therefore, for the structure of image display system 10 in FIG. 1, the luminance of the twice reflected lights (desired 3D floating image) is kept, and the luminance of once reflected lights (ghost images) is obviously reduced.

Table 1 shows light efficiencies of the reflected lights as illustrated in FIGS. 4(a)-4(i) and 5(a)-5(i). The light efficiency is represented by the percentage of the emitted lights forming the reflected images with respect to the originally outputted lights.

TABLE 1

| Transmittance axis | Left once reflected lights | Twice reflected lights | Right once reflected lights |
|---|---|---|---|
| 0 degree | 85% [FIG. 5(a)] | 59% [FIG. 5(b)] | 85% [FIG. 5(c)] |
| 45 degrees | 82% [FIG. 5(d)] | 66% [FIG. 5(e)] | 75% [FIG. 5(f)] |
| 90 degrees | 73% [FIG. 5(g)] | 73% [FIG. 5(h)] | 73% [FIG. 5(i)] |
| 0 degree | 18% [FIG. 4(a)] (Reduced by 79%) | 53% [FIG. 4(b)] (Reduced by 11%) | 18% [FIG. 4(c)] (Reduced by 79%) |
| 45 degrees | 71% [FIG. 4(d)] (Reduced by 14%) | 59% [FIG. 4(e)] (Reduced by 10%) | 61% [FIG. 4(f)] (Reduced by 18%) |
| 90 degrees | 15% [FIG. 4(g)] (Reduced by 80%) | 65% [FIG. 4(h)] (Reducedby 11%) | 15% [FIG. 4(i)] (Reduced by 80%) |

In Table 1, the light efficiencies of the simulation results from FIGS. 4(a)-4(i) are respectively compared to the light efficiencies of the simulation results from FIGS. 5(a)-5(i). For example, the light efficiency of 18% from FIG. 4(a) is significantly reduced by 79% compared to the light efficiency of 85% from FIG. 5(a), and the light efficiency of 53% from FIG. 4(b) is slightly reduced by 11% compared to the light efficiency of 59% from FIG. 5(b). In summary, as shown in Table 1, according to the embodiments of the disclosure, the light efficiencies of the twice reflected lights can maintain at 53% or higher when the light efficiencies of most of the once reflected lights are significantly reduced to 18% or lower, particularly for the cases where the transmittance axis is 0 degree or 90 degrees. Even for the cases where the transmittance axis is 45 degrees, the light efficiencies of the once reflected lights are reduced more than that of the twice reflected lights are.

In addition, the display luminance varies in different displaying regions. The display luminance can be understood as normalized light intensity, the center portion (where the twice reflected lights are projected) would be provided with higher display luminance, and the border portion (where the once reflected lights are projected) would be provided with lower display luminance. For example, the display luminance for the twice reflection may be 100% while the display luminance for the once reflections may be 15%. In total, the 3D floating image luminance equals to "display luminance" multiplies "light efficiency of a reflection". For example, for FIG. 4(a), the 3D floating image luminance could be 15%*18%=2.7%; for FIG. 4(b), the 3D floating image luminance could be 100%*53%=53%.

Accordingly, with the design of the embodiments of the disclosure, the light efficiencies of most ghost images can be significantly reduced, while the light efficiency of the desired 3D floating image can be substantially maintained. Therefore, the ghost images can be substantially eliminated, the desired 3D floating image can be provided with higher brightness and clearness, and thus an improved display effect of 3D floating images can be provided.

Figure 6A:
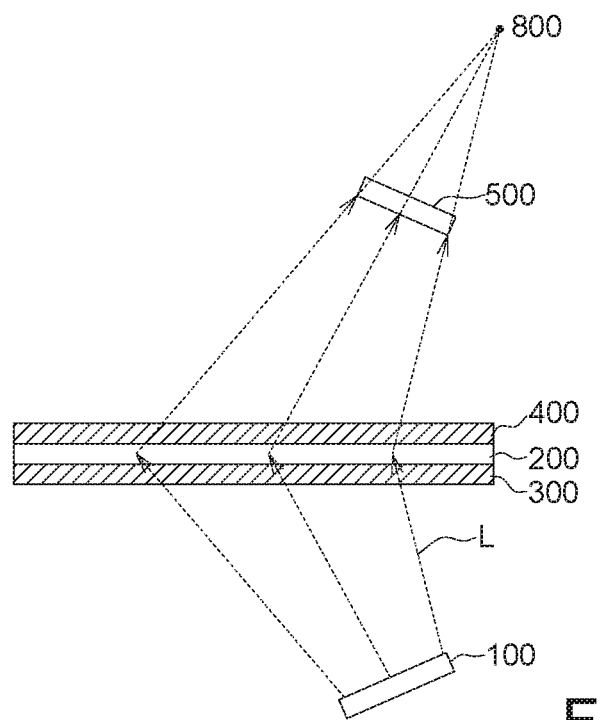
FIG. 6A is a schematic view of an image display system according to another embodiment of the disclosure.

FIG. 6A is a schematic view of an image display system 20 according to another embodiment of the disclosure. The elements in the embodiment sharing the same or similar labels with those in the previous embodiment are the same or similar elements, and the description of which is omitted.

As shown in FIG. 6A, the first polarizer 300 is attached to the back surface of the reflecting unit 200. In the embodiment as shown in FIG. 6A, the first polarizer 300 and the second polarizer 400 are attached to two opposite sides (the front surface and the back surface) of the reflecting unit 200.

Figure 6B:
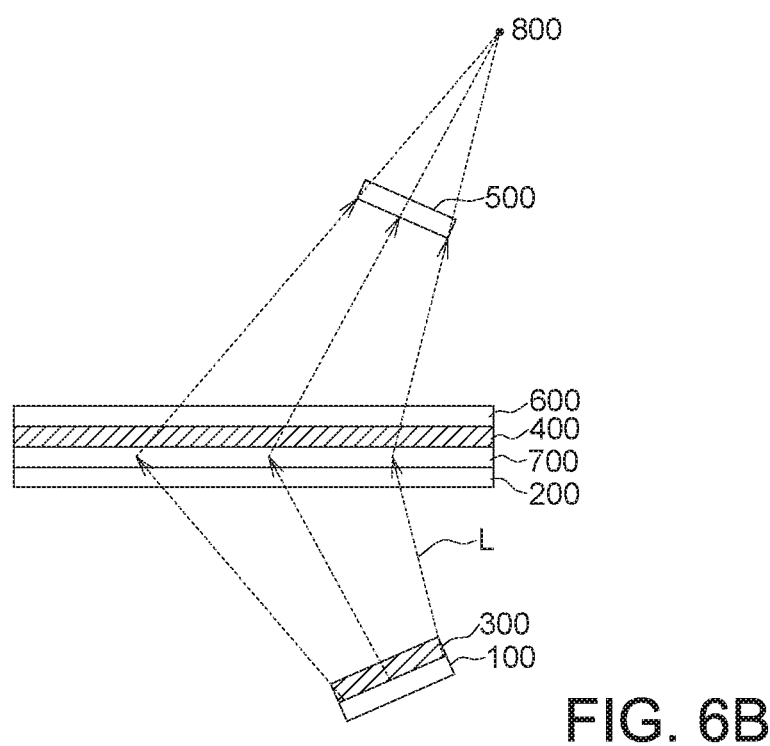
FIG. 6B is a schematic view of an image display system according to a further embodiment of the disclosure.

FIG. 6B is a schematic view of an image display system 30 according to a further embodiment of the disclosure. The elements in the embodiment sharing the same or similar labels with those in the previous embodiment are the same or similar elements, and the description of which is omitted.

In the embodiments, as shown in FIG. 6B, the image display system 30 may further include an antireflection layer 600, and the antireflection layer 600 is formed on a front surface of the second polarizer 400. In the embodiments, the antireflection layer 600 is located between the second polarizer 400 and the virtual floating base plane where a 3D floating image 500 is formed.

In the embodiments, as shown in FIG. 6B, the image display system 30 may further include an adhesive layer 700, and the adhesive layer 700 is formed between the second polarizer 400 and the reflecting unit 200. In the embodiments, a first refractive index of the adhesive layer 700 is equal to or greater than a second refractive index of the reflecting unit 200, and the first refractive index of the adhesive layer 700 is equal to or less than a third refractive index of the second polarizer 400. In the embodiments, the second refractive index of the reflecting unit 200 may be about 1.5.

Figure 7:
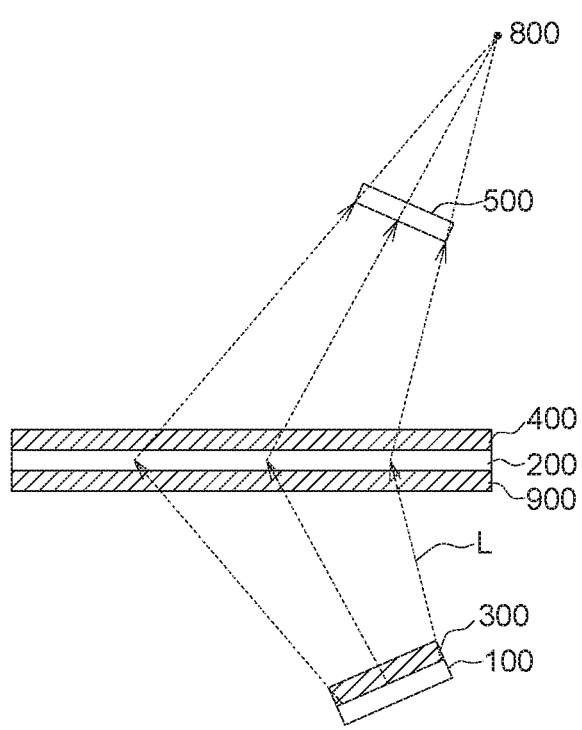
FIG. 7 is a schematic view of an image display system according to an additional embodiment of the disclosure.

FIG. 7 is a schematic view of an image display system 40 according to an additional embodiment of the disclosure. The elements in the present embodiment sharing the same or similar labels with those in the previous embodiment are the same or similar elements, and the description of which is omitted.

In the embodiments, as shown in FIG. 7, the image display system 40 may further include a third polarizer 900 disposed between the first polarizer 300 and the reflecting unit 200. In the embodiments, a second included angle from the absorption axis of the first polarizer 300 to an absorption axis of the third polarizer 900 in counterclockwise direction is equal to or less than 10 degrees and equal to or greater than −10 degrees (between 0±10 degrees).

In the embodiments, as shown in FIG. 7, the second polarizer 400 and the third polarizer 900 are attached to two opposite sides (the front surface and the back surface) of the reflecting unit 200, and the first polarizer 300 is attached to the display device 100.

In the embodiments as shown in FIG. 7, the absorption axis of the first polarizer 300 is substantially parallel to the absorption axis of the second polarizer 400, and the absorption axis of the first polarizer 300 is substantially parallel to the absorption axis of the third polarizer 900.

Figure 8:
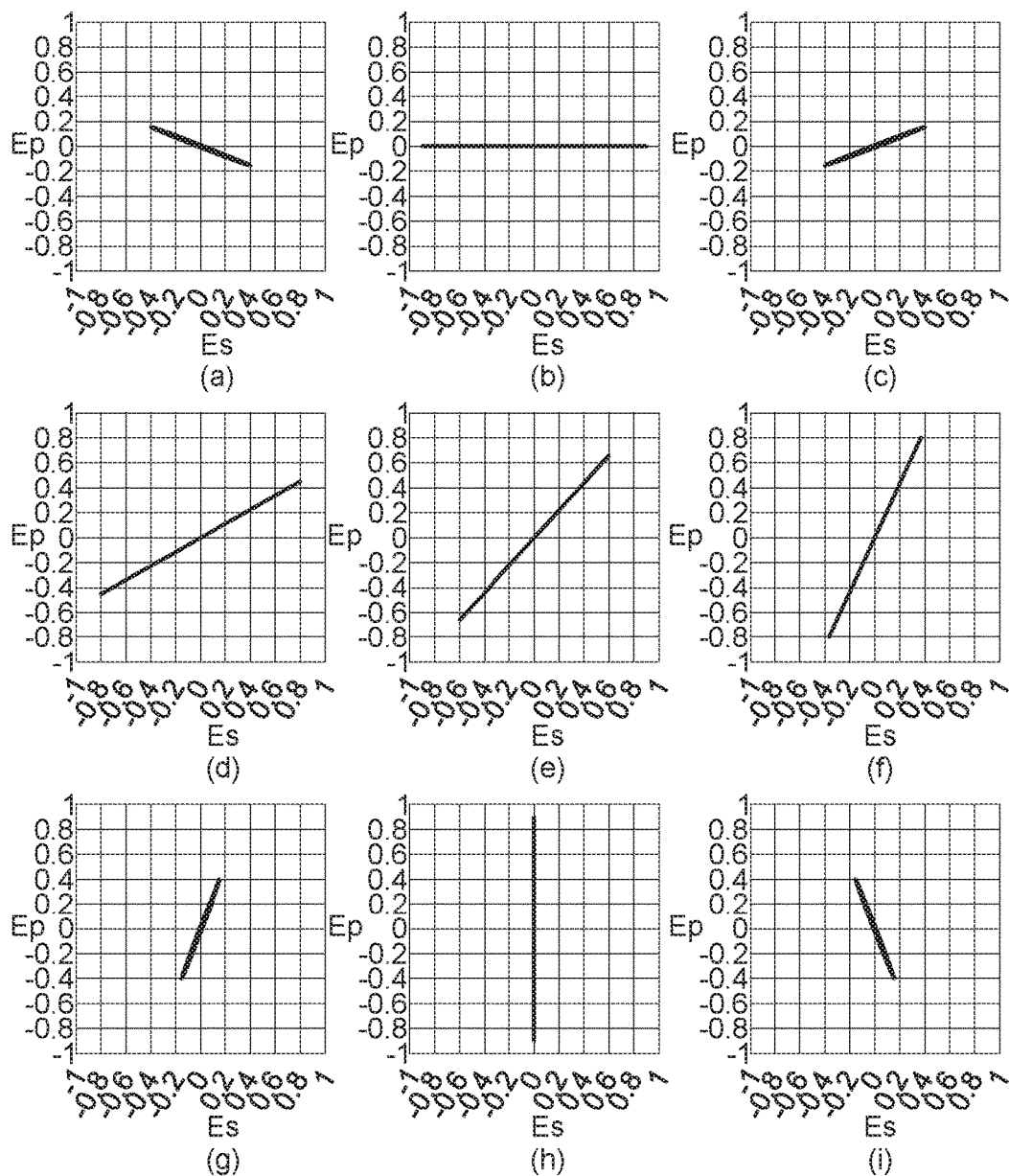
FIG. 8 shows simulation results (a)-(i) of polarization states of outputted lights from the display device of the image display system according to an additional embodiment of the disclosure.

FIGS. 8(a)~8(i) show simulation results of polarization states of outputted lights from the display device 100 of the image display system 40 according to an additional embodiment of the disclosure. FIGS. 8(a)-8(c) show polarization states of left once reflected lights (a), twice reflected lights (b), and right once reflected lights (c) when the transmittance axis of the first polarizer 300 is 0 degree (along X axis), FIGS. 8(d)-8(f) show polarization states of left once reflected lights (d), twice reflected lights (e), and right once reflected lights (f) when the transmittance axis of the first polarizer 300 is 45 degrees (on X-Y plane, and calculating included angle from X axis in counterclockwise direction), and FIGS. 8(g)-8(i) show polarization states of left once reflected lights (g), twice reflected lights (h), and right once reflected lights (i) when the transmittance axis of the first polarizer 300 is 90 degrees (along Y axis). In addition, Table 2 shows light efficiencies of the reflected lights as illustrated in FIGS. 8(a)-8(i). Likewise, in Table 2, the light efficiencies of the simulation results from FIGS. 8(a)-8(i) are respectively compared to the light efficiencies of the simulation results from FIGS. 5(a)-5(i).

TABLE 2

| Transmittance axis | Left once reflected lights | Twice reflected lights | Right once reflected lights |
|---|---|---|---|
| 0 degree | 11% [FIG. 8(a)] (Reduced by 87%) | 47% [FIG. 8(b)] (Reduced by 20%) | 11% [FIG. 8(c)] (Reduced by 87%) |
| 45 degrees | 63% [FIG. 8(d)] (Reduced by 24%) | 52% [FIG. 8(e)] (Reduced by 21%) | 55% [FIG. 8(f)] (Reduced by 27%) |
| 90 degrees | 13% [FIG. 8(g)] (Reduced by 83%) | 58% [FIG. 8(h)] (Reduced by 20%) | 13% [FIG. 8(i)] (Reduced by 83%) |

As shown in FIGS. 8(a)-8(i), after the reflected lights pass through the second polarizer which has an absorption axis substantially parallel to the first polarizer, all of the once reflected lights and the twice reflected lights show linear polarization states. That is, the lights with less linear polarization state have been filtered and blocked.

Likewise, as shown in Table 2, according to the embodiments of the disclosure, the light efficiencies of the twice reflected lights can maintain at 47% or higher when the light efficiencies of most of the once reflected lights are significantly reduced to 13% or lower, particularly for the cases where the transmittance axis is 0 degree or 90 degrees. Even for the cases where the transmittance axis is 45 degrees, the light efficiencies of the once reflected lights are reduced more than that of the twice reflected lights are.

Figure 9:
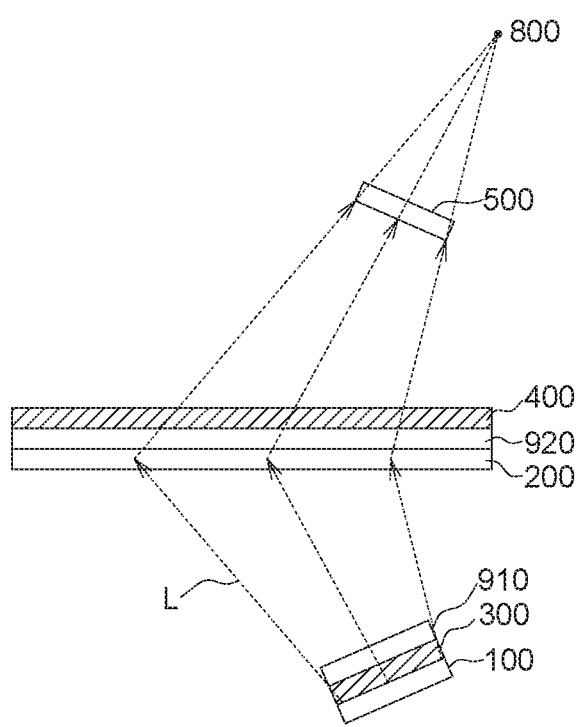
FIG. 9 is a schematic view of an image display system according to a further another embodiment of the disclosure.

FIG. 9 is a schematic view of an image display system 50 according to a further another embodiment of the disclosure. The elements in the embodiment sharing the same or similar labels with those in the previous embodiment are the same or similar elements, and the description of which is omitted.

In the embodiments, as shown in FIG. 9, the image display system 50 may further include a first retarder 910 and a second retarder 920, and the first retarder 910 and a second retarder 920 are disposed between the first polarizer 300 and the second polarizer 400.

In the embodiments, as shown in FIG. 9, an included angle from a linear polarization of a light passing through the first retarder 910 to the second retarder 920 and the absorption axis of the second polarizer 400 in counterclockwise direction is between 90±10 degrees. In other words, a light passing through the first retarder 910 and then the second retarder 920 turns into a linearly polarized light with a linear polarization, and the included angle from the linear polarization to the absorption axis of the second polarizer 400 in counterclockwise direction is about between 90±10 degrees. As such, the linearly polarized light outputted from the second retarder 920 can pass through the second polarizer 400 and reaches the virtual floating base plane where a 3D floating image 500 is formed.

In the embodiments, as shown in FIG. 9, the linear polarization of the light passing through the first retarder 910 and the second retarder 920 is substantially perpendicular to the absorption axis of the second polarizer 400.

Conditions for meeting the requirements that linear polarization of a light passing through the first retarder 910 and the second retarder 920 is substantially perpendicular to the absorption axis of the second polarizer 400 will be discussed hereinafter.

In some embodiment, an included angle from a slow axis of the first retarder 910 to a slow axis of the second retarder 920 in counterclockwise direction may be between 90±10 degrees. In some embodiment, the slow axis of the first retarder 910 may be substantially perpendicular to the slow axis of the second retarder 920.

In some embodiment, an included angle from the absorption axis of the first polarizer 300 to the slow axis of the first retarder 910 in counterclockwise direction may be between 45±10 degrees, and an included angle from the absorption axis of the first polarizer 300 to the slow axis of the second retarder 920 in counterclockwise direction may be between 135±10 degrees. For example, the absorption axis of the first polarizer 300 is defined as 0 degree, the slow axis of the first retarder 910 with λ/4 retardation may be about 45 degrees, the slow axis of the second retarder 920 with λ/4 retardation may be about 135 degrees, and the absorption axis of the second polarizer may be about 0 degree.

In the embodiment as shown in FIG. 9, the reflecting unit 200 is located between the first retarder 910 and the second retarder 920.

Figure 10:
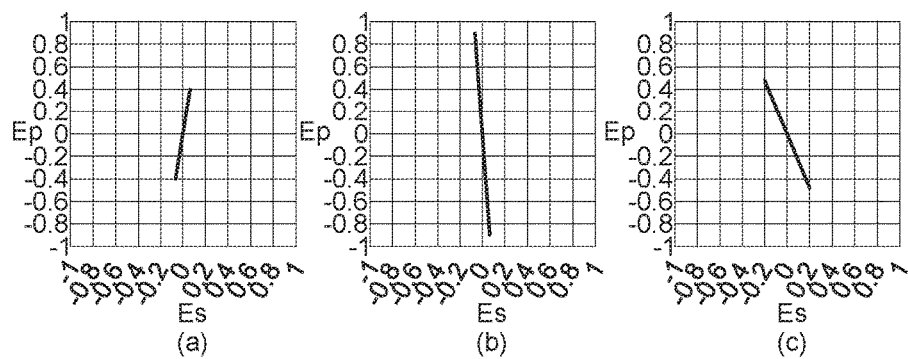
FIG. 10 shows simulation results (a)-(c) of polarization states of outputted lights from the display device of the image display system according to a further another embodiment of the disclosure.
Figure 11:
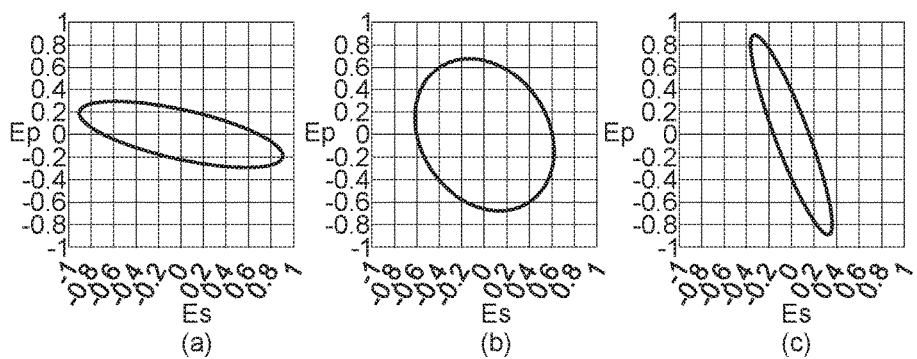
FIG. 11 shows simulation results (a)-(c) of polarization states of outputted lights from a display device of a common 3D floating image display system with a crossed mirror array, wherein outputted lights from the display device are linearly polarized by a polarizer and then circularly polarized by a λ/4 retarder before entering the crossed mirror array.

FIGS. 10(a)~10(c) show simulation results of polarization states of outputted lights from the display device 100 of the image display system 50 according to a further another embodiment of the disclosure. FIGS. 11(a)~11(c) show simulation results of polarization states of outputted lights from a display device of a common 3D floating image display system with a crossed mirror array, wherein outputted lights from the display device are linearly polarized by a polarizer and then circularly polarized by a λ/4 retarder before entering the crossed mirror array. FIGS. 10(a)-10(c) show polarization states of left once reflected lights (a), twice reflected lights (b), and right once reflected lights (c) from the image display system 50, and FIGS. 11(a)-11(c) show polarization states of left once reflected lights (a), twice reflected lights (b), and right once reflected lights (c) from the common 3D floating image display system with a crossed mirror array, a polarizer and a λ/4 retarder.

As shown in FIGS. 11(a) and 11(c), the outputted lights pass through a polarizer and a λ/4 retarder and then pass through the crossed mirror array, and the resulting once reflected lights show less circular polarization states than the twice reflected lights. As shown in FIGS. 10(a)-10(c), after the reflected lights pass through the second retarder 920, which turns circularly polarized lights into linearly polarized lights, and then pass through the second polarizer which has an absorption axis substantially perpendicular to the linear polarization of the lights outputted from the second retarder, the once reflected lights and the twice reflected lights show linear polarization states. That is, the lights with less circular polarization state have been filtered and blocked by the second retarder along with the second polarizer.

Table 3 shows light efficiencies of the reflected lights as illustrated in FIGS. 10(a)-10(c) and 11(a)-11(c). Likewise, in Table 3, the light efficiencies of the simulation results from FIGS. 10(a)-10(c) are respectively compared to the light efficiencies of the simulation results from FIGS. 11(a)-11(c).

TABLE 3

| Left once reflected lights | Twice reflected lights | Right once reflected lights |
|---|---|---|
| 76% [FIG. 11(a)] | 64% [FIG. 11(b)] | 81% [FIG. 11(c)] |
| 13% [FIG. 10(a)] | 60% [FIG. 10(b)] | 24% [FIG. 10(c)] |
| (Reduced by 83%) | (Reduced by 18%) | (Reduced by 68%) |

As shown in Table 2, according to the embodiments of the disclosure, the light efficiencies of the twice reflected lights can maintain at 60% when the light efficiencies of the once reflected lights are significantly reduced to 13% and 24%.

Accordingly, with the design of the embodiments of the disclosure, for both of the linearly polarized lights and the circularly polarized lights, the light efficiencies of most ghost images can be significantly reduced, while the light efficiency of the desired 3D floating image can be substantially maintained. Therefore, the ghost images can be substantially eliminated, the desired 3D floating image can be provided with higher brightness and clearness, and thus an improved display effect of 3D floating images can be provided.

Figure 12:
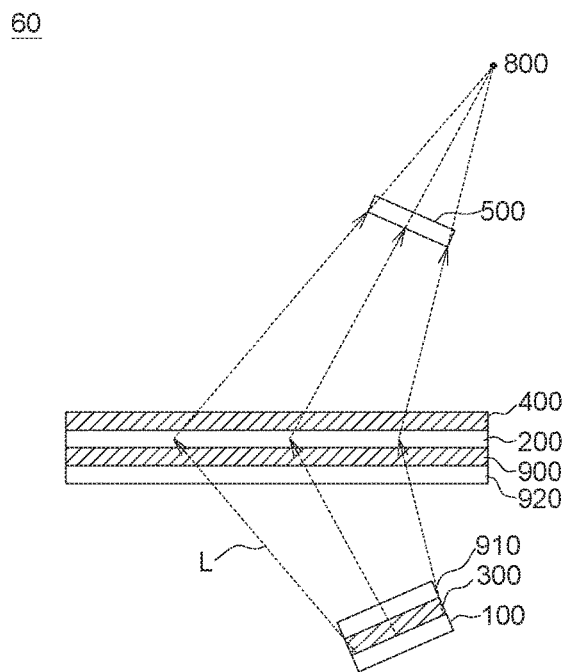
FIG. 12 is a schematic view of an image display system according to a still another embodiment of the disclosure.

FIG. 12 is a schematic view of an image display system 60 according to a still another embodiment of the disclosure. The elements in the embodiment sharing the same or similar labels with those in the previous embodiment are the same or similar elements, and the description of which is omitted.

In the embodiments, as shown in FIG. 12, the image display system 60 may further include a third polarizer 900 disposed between the first polarizer 300 and the reflecting unit 200, and the first retarder 910 and the second retarder 920 are located between the first polarizer 300 and the third polarizer 900.

In the embodiments, as shown in FIG. 12, an included angle from the linear polarization of the light passing through the first retarder 910 to the second retarder 920 to an absorption axis of the third polarizer 900 in counterclockwise direction is between 90±10 degrees, and an included angle from the linear polarization of the light passing through the first retarder 910 to the second retarder 920 and the absorption axis of the second polarizer 400 in counterclockwise direction is also between 90±10 degrees. In other words, a light passing through the first retarder 910 and then the second retarder 920 turns into a linearly polarized light with a linear polarization, and the included angle from the linear polarization to the absorption axis of the third polarizer 900 in counterclockwise direction and the included angle from the linear polarization to the absorption axis of the second polarizer 400 in counterclockwise direction are both about between 90±10 degrees. As such, the linearly polarized light outputted from the second retarder 920 can pass through the third polarizer 900 and the second polarizer 400 and reaches the virtual floating base plane where a 3D floating image 500 is formed.

In the embodiments, as shown in FIG. 12, the linear polarization of the light passing through the first retarder 910 and the second retarder 920 is substantially perpendicular to the absorption axis of the second polarizer 400 and also perpendicular to the absorption axis of the third polarizer 900.

Conditions for meeting the requirements that linear polarization of a light passing through the first retarder 910 and the second retarder 920 is substantially perpendicular to the absorption axis of the second polarizer 400 and the absorption axis of the third polarizer 900 will be discussed hereinafter.

In the embodiment as shown in FIG. 12, the first polarizer 300 is attached to the display device 100, and the first retarder 910 and the second retarder 920 are attached to the first polarizer 300 and the third polarizer 900, respectively.

Figure 13:
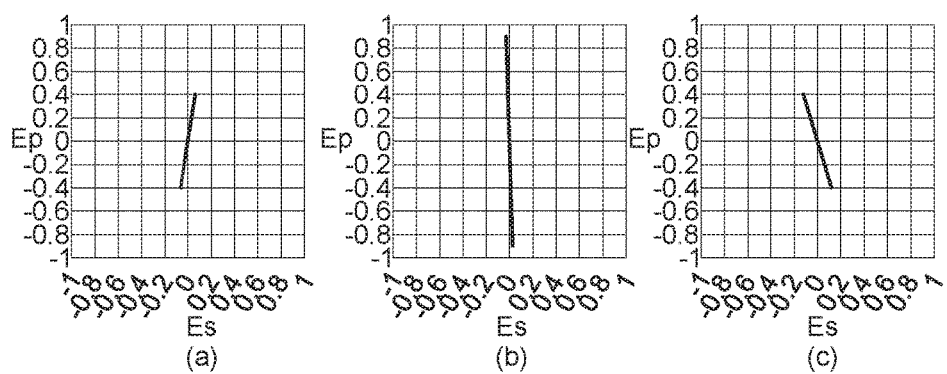
FIG. 13 shows simulation results (a)-(c) of polarization states of outputted lights from the display device of the image display system according to a still another embodiment of the disclosure.

FIGS. 13(a)-13(c) show simulation results of polarization states of outputted lights from the display device 100 of the image display system 60 according to a still another embodiment of the disclosure. In addition, Table 4 shows light efficiencies of the reflected lights as illustrated in FIGS. 13(a)-13(c). Likewise, in Table 4, the light efficiencies of the simulation results from FIGS. 13(a)-13(c) are respectively compared to the light efficiencies of the simulation results from FIGS. 11(a)-11(c).

TABLE 4

| Left once reflected lights | Twice reflected lights | Right once reflected lights |
|---|---|---|
| 12% [FIG. 13(a)] | 56% [FIG. 13(b)] | 13% [FIG. 13(c)] |
| (Reduced by 83%) | (Reduced by 23%) | (Reduced by 83%) |

As shown in Table 4, according to the embodiments of the disclosure, the light efficiencies of the twice reflected lights can maintain at 56% when the light efficiencies of the once reflected lights are significantly reduced to 12% and 13%.

Following is the description of conditions for meeting the requirements that linear polarization of a light passing through the first retarder 910 and the second retarder 920 is substantially perpendicular to the absorption axis of the second polarizer 400 and optionally the absorption axis of the third polarizer 900.

Figure 14:
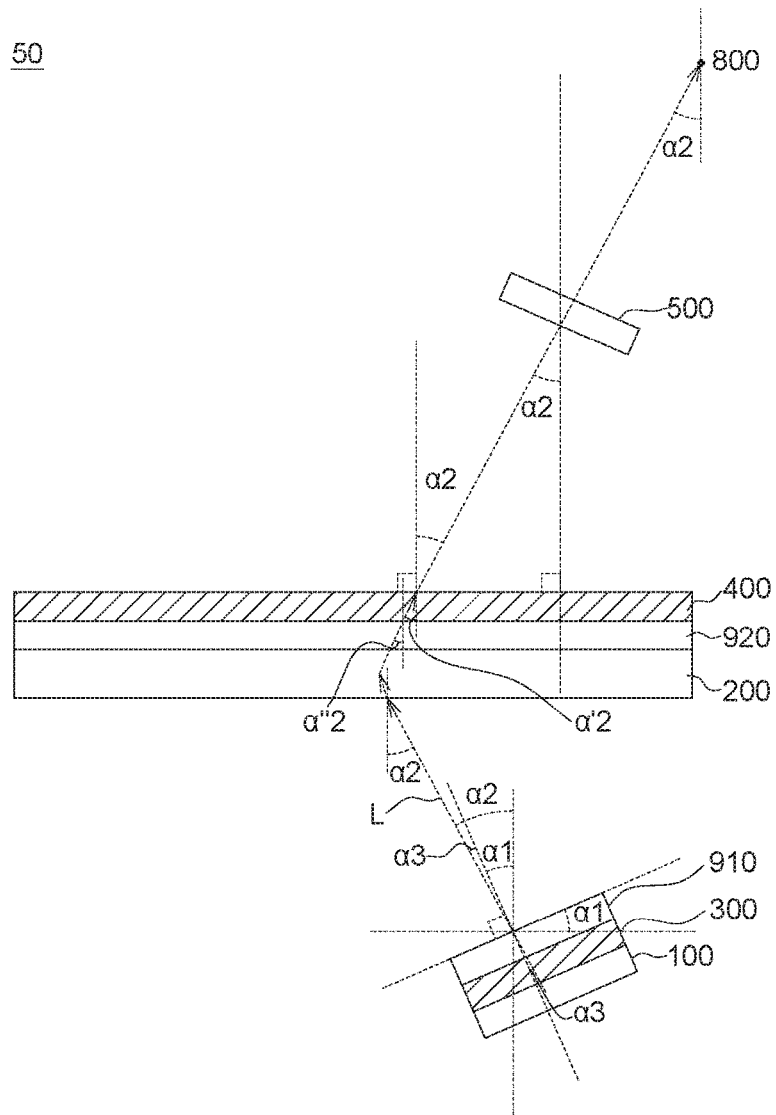
FIG. 14 illustrates the angle parameters for the image display system according to a further another embodiment of the disclosure.
Figure 15:
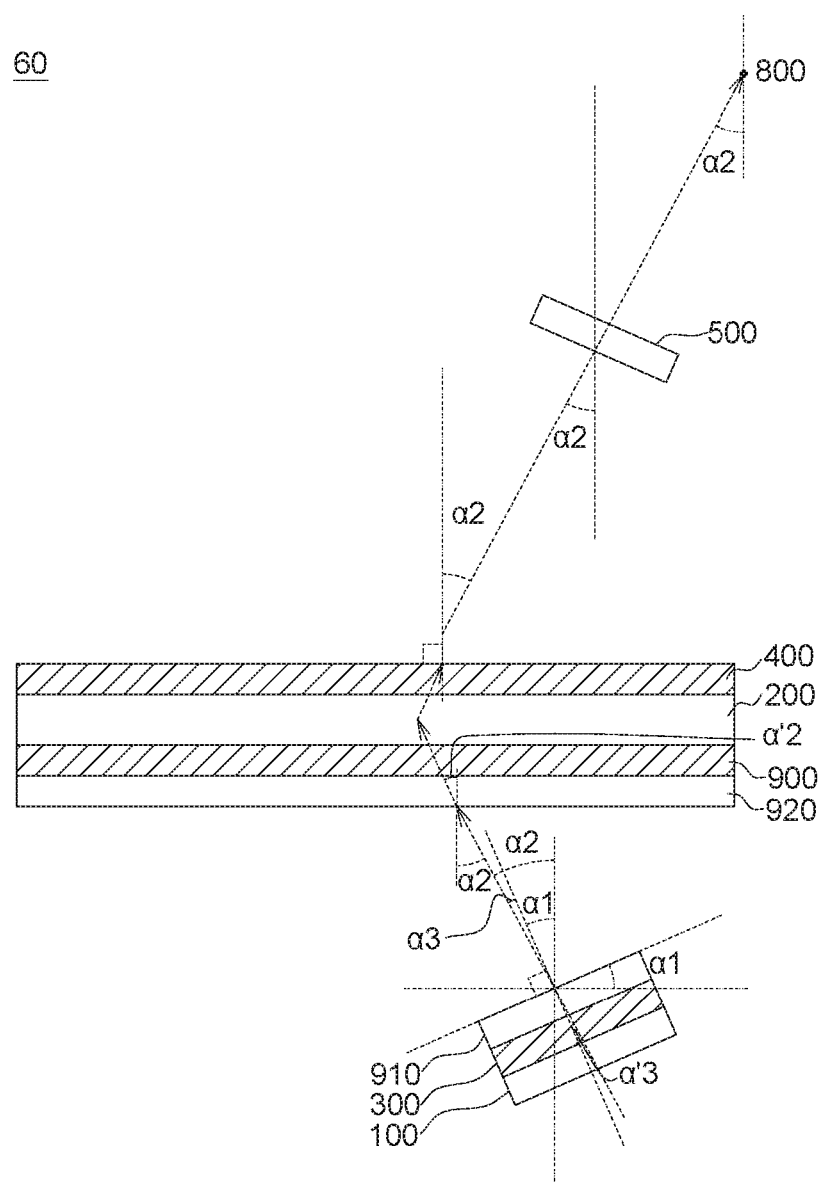
FIG. 15 illustrates the angle parameters for the image display system according to a still another embodiment of the disclosure.
Figure 16:
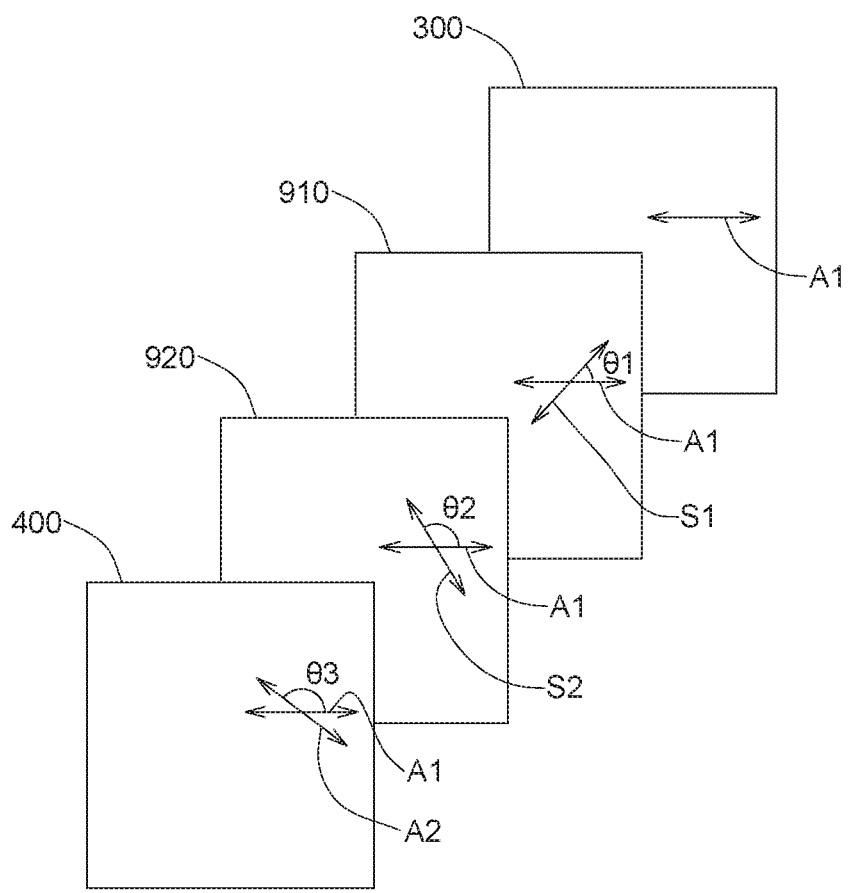
FIG. 16 shows examples of the angles between absorption axes of polarizers and slow axes of retarders.

FIG. 14 illustrates the angle parameters for the image display system 50 according to a further another embodiment of the disclosure, FIG. 15 illustrates the angle parameters for the image display system 60 according to a still another embodiment of the disclosure, and FIG. 16 shows examples of the included angles from absorption axes of polarizers to slow axes of retarders in counterclockwise direction.

Please refer to FIG. 14, the image display system 50 satisfies the following equations: $n_{ret1}*\sin(\alpha'3)=\sin(\alpha3)$, $n_{pol2}*\sin(\alpha'2)=\sin(\alpha2)$, and $n_{ret2}*\sin(\alpha''2)=n_{pol1}*\sin(\alpha'2)$, wherein α1 is the tilt angle of the display device 100, α2 is the view point angle from the observer 800, α3=α2−α1, $n_{ret1}$ is the refractive index of the first retarder 910, $n_{ret2}$ is the refractive index of the second retarder 920, $n_{pol1}$ is the refractive index of the first polarizer 300, and $n_{pol2}$ is the refractive index of the second polarizer 400. R1(α'3) is the retardation at angle α'3 in the first retarder 910, and R2(α''2) is the retardation at angle α''2 in the second retarder 920.

Please refer to FIG. 15, the image display system 60 satisfies the following equations: $n_{ret1}*\sin(\alpha'3)=\sin(\alpha3)$ and $n_{ret2}*\sin(\alpha'2)=\sin(\alpha2)$, wherein α1 is the tilt angle of the display device 100, α2 is the view point angle from the observer 800, α2 is greater than 40 degrees and less than 50 degrees for reducing reflection effect from the bottom surface of reflecting unit 200, α3=α2−α1, $n_{ret1}$ is the refractive index of the first retarder 910, and $n_{ret2}$ is the refractive index of the second retarder 920. R1(α'3) is the retardation at angle α'3 in the first retarder 910, and R2(α'2) is the retardation at angle α'2 in the second retarder 920.

Next, please refer to FIG. 16, the conditions are calculated with Mueller Matrix and Stokes vector.

Polarization state through the first polarizer 300 is as formula (1):

$$\begin{pmatrix} S_0 \\ S_1 \\ S_2 \\ S_3 \end{pmatrix} = \begin{pmatrix} 1 \\ 1 \\ 0 \\ 0 \end{pmatrix} \quad (1)$$

Polarization state through the first retarder 910 is as formula (2):

$$\begin{pmatrix} S'_0 \\ S'_1 \\ S'_2 \\ S'_3 \end{pmatrix} = (T_{\theta 1})(C_{\delta 1})(T_{-\theta 1}) \begin{pmatrix} S_0 \\ S_1 \\ S_2 \\ S_3 \end{pmatrix} \quad (2)$$

Polarization state through the second retarder 920 is as formula (3):

$$\begin{pmatrix} S''_0 \\ S''_1 \\ S''_2 \\ S''_3 \end{pmatrix} = (T_{\theta 1})(C_{\delta 2})(T_{-\theta 1}) \begin{pmatrix} S'_0 \\ S'_1 \\ S'_2 \\ S'_3 \end{pmatrix} \quad (3)$$

The formulas (1), (2) and (3) are combined as follows:

$$\begin{pmatrix} S''_0 \\ S''_1 \\ S''_2 \\ S''_3 \end{pmatrix} = (T_{\theta 2})(C_{\delta 2})(T_{-\theta 2})(T_{\theta 1})(C_{\delta 1})(T_{-\theta 1}) \begin{pmatrix} 1 \\ 1 \\ 0 \\ 0 \end{pmatrix} \quad (4)$$

wherein, $(T_\theta) = \begin{pmatrix} 1 & 0 & 0 & 0 \\ 0 & \cos 2\theta & -\sin 2\theta & 0 \\ 0 & \sin 2\theta & \cos 2\theta & 0 \\ 0 & 0 & 0 & 1 \end{pmatrix}$, $(C_\delta) = \begin{pmatrix} 1 & 0 & 0 & 0 \\ 0 & 1 & 0 & 0 \\ 0 & 0 & \cos\delta & \sin\delta \\ 0 & 0 & -\sin\delta & \cos\delta \end{pmatrix}$, θ can be θ1 or θ2, θ1 is the included angle from the absorption axis A1 of the first polarizer 300 to the slow axis S1 of the first retarder 910 in counterclockwise direction, θ2 is the included angle from the absorption axis A1 of the first polarizer 300 to the slow axis S2 of the second retarder 920 in counterclockwise direction, δ is the phase difference (phase retardation) of the retarder and defined as $\delta=(2\pi/\lambda)*R$, wherein R is retardation value, and λ is the wavelength.

In order for the polarization state through the second retarder 920 to become linear, the following has to be satisfied:

$$S''3 = 0 \quad (5)$$

For the image display system 50, the following has to be satisfied:

$$S''3 = (\cos^2(2\theta_1) + \sin^2(2\theta_1)\cos(\delta_{R1(\alpha'3)}))\sin 2\theta_2 \sin\delta_{R2(\alpha''2)} -$$
$$\sin 2\theta_1 \cos 2\theta_1 (1 - \cos\delta_{R1(\alpha'3)})\sin\delta_{R2(\alpha''2)}\cos 2\theta_2 +$$
$$\sin 2\theta_1 \sin\delta_{R1(\alpha'3)}\cos\delta_{R2(\alpha''2)} = 0$$

$$\theta_2 = \text{function}(\theta_1, \delta_{R1(\alpha'3)}, \delta_{R2(\alpha''2)})$$

For the image display system 60, the following has to be satisfied:

$$S''3 = (\cos^2(2\theta_1) + \sin^2(2\theta_1)\cos(\delta_{R1(\alpha'3)}))\sin 2\theta_2 \sin\delta_{R2(\alpha'2)} -$$
$$\sin 2\theta_1 \cos 2\theta_1 (1 - \cos\delta_{R1(\alpha'3)})\sin\delta_{R2(\alpha'2)}\cos 2\theta_2 +$$
$$\sin 2\theta_1 \sin\delta_{R1(\alpha'3)}\cos\delta_{R2(\alpha'2)} = 0$$

$$\theta_2 = \text{function}(\theta_1, \delta_{R1(\alpha'3)}, \delta_{R2(\alpha'2)})$$

Accordingly, the polarization state through the second retarder 920 is represented as follows:

$$\begin{pmatrix} S''_0 \\ S''_1 \\ S''_2 \\ S''_3 \end{pmatrix} = \begin{pmatrix} 1 \\ \cos 2\chi \cos 2\phi \\ \cos 2\chi \sin 2\phi \\ \sin 2\chi \end{pmatrix} \quad (5)$$

wherein, X is the elasticity of polarization state, φ is the Azimuth angle of transmission.

Next, the following is derived from the formula (5):

$$(S''_3) = (\sin 2\chi) = 0$$

Therefore, χ=0, and $S''_1=\cos 2\phi$ or $S''_2=\sin 2\phi$. Therefore, the following is obtained:

$$\phi = (\alpha \cos(S''_1))/2 = (\alpha \sin(S''_2))/2$$

Accordingly, the included angle θ3 from the absorption axis A1 of the first polarizer 300 to the absorption axis A2 of the second polarizer 400 (linear polarization of the light outputted from the second retarder 920) in counterclockwise direction is the following:

$$\theta_3 = \phi + \pi/2$$

For example, when the absorption axis of the first polarizer 300 is set to be 0 degree, R1(α'3) of the first retarder 910 is λ/4, θ1 is set at 45 degrees, R2(α'2) or R2(α"2) of the second retarder 920 is λ/4, θ2 is set at 135 degrees, and the calculated included angle θ3 from the absorption axis of the second polarizer 400 to the absorption axis of the first polarizer 300 in counterclockwise direction is about 0 degree.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An image display system, comprising:
   a display device;
   a reflecting unit;
   a first polarizer disposed between the display device and the reflecting unit; and
   a second polarizer, wherein the reflecting unit is located between the first polarizer and the second polarizer;
   wherein a first angle from an absorption axis of the first polarizer to an absorption axis of the second polarizer in counterclockwise direction is between 0±10 degrees.

2. The image display system according to claim 1, wherein the reflecting unit comprises a crossed mirror array or a total internal reflection structure.

3. The image display system according to claim 1, wherein the absorption axis of the first polarizer is substantially parallel to the absorption axis of the second polarizer.

4. The image display system according to claim 1, wherein the second polarizer is disposed between the reflecting unit and a virtual floating base plane where a 3D floating image is formed.

5. The image display system according to claim 1, wherein the first polarizer is attached to the display device or attached to the reflecting unit.

6. The image display system according to claim 1, further comprising:
   a third polarizer disposed between the first polarizer and the reflecting unit, wherein a second angle from the absorption axis of the first polarizer to an absorption axis of the third polarizer in counterclockwise direction is between 0±10 degrees.

7. The image display system according to claim 6, wherein the second polarizer and the third polarizer are attached to two opposite sides of the reflecting unit, and the first polarizer is attached to the display device.

8. The image display system according to claim 6, wherein the absorption axis of the first polarizer is substantially parallel to the absorption axis of the second polarizer, and the absorption axis of the first polarizer is substantially parallel to the absorption axis of the third polarizer.

9. The image display system according to claim 1, further comprising:
   an antireflection layer formed on the second polarizer, wherein the antireflection layer is located between the second polarizer and a virtual floating base plane where a 3D floating image is formed.

10. The image display system according to claim 1, further comprising:
    an adhesive layer formed between the second polarizer and the reflecting unit, wherein a first refractive index of the adhesive layer is equal to or greater than a second refractive index of the reflecting unit, and the first refractive index of the adhesive layer is equal to or less than a third refractive index of the second polarizer.

11. The image display system according to claim 1, further comprising:
    a first retarder and a second retarder disposed between the first polarizer and the second polarizer, wherein a third angle from a slow axis of the first retarder to a slow axis of the second retarder in counterclockwise direction is between 90±10 degrees.

12. The image display system according to claim 11, wherein the slow axis of the first retarder is substantially perpendicular to the slow axis of the second retarder.

13. The image display system according to claim 11, wherein the reflecting unit is located between the first retarder and the second retarder.

14. The image display system according to claim 11, wherein a fourth angle from the absorption axis of the first polarizer to the slow axis of the first retarder in counterclockwise direction is between 45±10 degrees, and a fifth angle from the absorption axis of the first polarizer to the slow axis of the second retarder in counterclockwise direction is between 135±10 degrees.

15. The image display system according to claim 11, further comprising:
    a third polarizer disposed between the first polarizer and the reflecting unit, wherein the first retarder and the second retarder are located between the first polarizer and the third polarizer.

16. The image display system according to claim 15, wherein the first polarizer is attached to the display device, and the first retarder and the second retarder are attached to the first polarizer and the third polarizer, respectively.

17. An image display system, comprising:
    a display device;
    a reflecting unit;
    a first polarizer disposed between the display device and the reflecting unit;
    a second polarizer, wherein the reflecting unit is located between the first polarizer and the second polarizer, wherein a first angle from an absorption axis of the first polarizer to an absorption axis of the second polarizer in counterclockwise direction is between 0±10 degrees; and
    a first retarder and a second retarder disposed between the first polarizer and the second polarizer;
    wherein an included angle from a linear polarization of a light passing through the first retarder to the second retarder and the absorption axis of the second polarizer in counterclockwise direction is between 90±10 degrees.

18. The image display system according to claim 17, wherein the linear polarization of the light passing through the first retarder and the second retarder is substantially perpendicular to the absorption axis of the second polarizer.

19. The image display system according to claim 17, further comprising:
    a third polarizer disposed between the first polarizer and the reflecting unit, wherein the first retarder and the second retarder are located between the first polarizer and the third polarizer.

20. The image display system according to claim 19, wherein an additional included angle from the linear polarization of the light passing through the first retarder to the second retarder to an absorption axis of the third polarizer in counterclockwise direction is between 90±10 degrees.

* * * * *